US008750185B2

(12) United States Patent
Seok

(10) Patent No.: US 8,750,185 B2
(45) Date of Patent: Jun. 10, 2014

(54) APPARATUS AND METHOD FOR POWER SAVE MODE IN WIRELESS LOCAL AREA NETWORK

(75) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 753 days.

(21) Appl. No.: 12/853,918

(22) Filed: Aug. 10, 2010

(65) Prior Publication Data

US 2011/0038291 A1 Feb. 17, 2011

Related U.S. Application Data

(60) Provisional application No. 61/232,791, filed on Aug. 11, 2009.

(30) Foreign Application Priority Data

Dec. 8, 2009 (KR) .................. 10-2009-0120869

(51) Int. Cl.
*G08C 17/00* (2006.01)
(52) U.S. Cl.
USPC ........... 370/311; 370/315; 370/351; 370/389; 370/392
(58) Field of Classification Search
None
See application file for complete search history.

(56) References Cited

U.S. PATENT DOCUMENTS

| 2003/0231608 | A1* | 12/2003 | Wentink | 370/338 |
|---|---|---|---|---|
| 2004/0125778 | A1* | 7/2004 | Lin et al. | 370/338 |
| 2006/0171341 | A1* | 8/2006 | Wang et al. | 370/311 |
| 2006/0285526 | A1* | 12/2006 | Jang et al. | 370/338 |
| 2007/0291728 | A1* | 12/2007 | Dalsgaard et al. | 370/347 |
| 2008/0095091 | A1* | 4/2008 | Surineni et al. | 370/311 |
| 2008/0219228 | A1* | 9/2008 | Seok et al. | 370/338 |
| 2009/0196211 | A1* | 8/2009 | Wentink | 370/311 |
| 2010/0008274 | A1* | 1/2010 | Kneckt et al. | 370/311 |
| 2010/0039982 | A1* | 2/2010 | Itagaki et al. | 370/315 |
| 2010/0046430 | A1* | 2/2010 | Naito et al. | 370/328 |
| 2010/0153727 | A1* | 6/2010 | Reznik et al. | 713/171 |
| 2010/0165896 | A1* | 7/2010 | Gong et al. | 370/311 |

FOREIGN PATENT DOCUMENTS

KR 10-2009-0048159 A 5/2009

\* cited by examiner

*Primary Examiner* — Robert C Scheibel
*Assistant Examiner* — Gautam Sharma
(74) *Attorney, Agent, or Firm* — Birch, Stewart, Kolasch & Birch, LLP

(57) ABSTRACT

A method and apparatus of a power save mode in a wireless local area network is disclosed. A station transmits a power save mode (PSM) request frame including a wakeup schedule for the PSM to the peer station via an access point (AP) or via a Tunneled Direct link Setup (TDLS) direct link. The station receives a PSM response frame in response to to the PSM request frame from the peer station via the TDLS direct link.

14 Claims, 7 Drawing Sheets

APPARATUS AND METHOD FOR POWER SAVE MODE IN WIRELESS LOCAL AREA NETWORK

CROSS-REFERENCE TO RELATED APPLICATIONS

This application claims the benefit of priority of U.S. Provisional application 61/232,791 filed on Aug. 11, 2009, and Korean Patent Application No. 10-2009-0120869 filed on Dec. 8, 2009, all of which are incorporated by reference in their entirety herein.

BACKGROUND OF THE INVENTION

1. Field of the Invention

The present invention relates to a wireless local area network (WLAN), and more specifically to an apparatus and method for managing power save mode in a WLAN system.

2. Related Art

Advances in a wireless local access network (WLAN) make mobile phone users, such as Laptop computer users, easy to perform their works due to an improved mobility. For example, users can carry with their laptop computers to a meeting room in order to attend a conference, and can get on a local network through WLAN.

For a system based on Institute of Electrical and Electronics Engineers (IEEE) 802.11 standards, Basic Service Set (BSS) refers to a station assembly that is successfully synchronized. And a Basic Service Area (BSA) refers to an area including members that consist of BSS. BSA may be changed according to characteristics of radio wave in a wireless media. BSS may be basically classified into two configurations, an independent BSS and an infrastructured BSS (IBSS). The former implies BSS that establishes a self-contained network and cannot access to a Distribution System (DS), and the latter implies BSS that includes one or more a Access Point (AP), the Distribution System (DS), and the like and generally use AP in all of the communication processes including the communications between the stations.

According to IEEE 802.11e standard "Part 11: Wireless LAN Medium Access Control (MAC) and Physical Layer (PHY) specifications/Amendment 8: Medium Access Control (MAC) Quality of Service Enhancements" published at Nov. 11, 2005, it was not allow to directly transmit data between non-AP STAs in the IBSS, but it surely required through a AP in order to the data transmissions. It means that the station in BSS cannot directly transmit data to other STA, and pass through AP in order to frame transmission.

Further, since TREE 802.11e standard, a Direct link Setup (DLS) between non-AP STAs is having supported. The station can directly transmit the frame to other station through DLS Direct link The station is operated in two power management modes, such as one of an Active Mode (AM) and a Power Save Mode (PSM). The station in the AM keeps in the awake state, and the station in the PSM transitions between the wakeup state and a doze state. The station is awake at the beginning of the wakeup state and stays awake during a wake window. The station in the wakeup state can transmit and/or receive frames. The station in the doze state cannot transmit and/or receive frames.

Generally, the station belongs to user as a portable device, so that supporting PSM is essential to effectively manage a power. In the IEEE 802.11e standard, the management of the power is called an Automatic Power Save Deliver (APSD). APSD has two mechanisms: an unscheduled APSD (U-APSD) and a scheduled APSD (S-APSD).

The management of the power is needed for the direct link. According to IEEE 802.11e, after DLS Direct link is setup, the station in AM or PSM transmits a DATA Frame and/or a Management Frame to other station through DLS Direct link.

In order to establishing DLS direct link, a DLS Request Frame and a DLS Response Frame between two non-AP STAs are exchanged through AP. It means that AP supporting IEEE 802.11e is required in order for the setup of the DLS direct link. However, since WLAN system that has been used widely is based only on the IEEE 802.11a/b/g standards, the AP supporting the IEEE 802.11a/b/g cannot support DLS. Therefore, even though non-AP STAs supports IEEE 802.11e, non-AP STAs cannot setup DLS direct link through the AP, so that DLS service cannot be utilized.

A Tunneled Direct link Setup (TDLS) has been introduced in order to establish a direct link between non-AP STAs even if the AP cannot support IEEE 802.11e. In the TDLS, TDLS direct link is set up through encapsulated data frames.

There is a need for a technique for effectively managing the PSM under the TDLS direct link

SUMMARY OF THE INVENTION

The present invention provides a method and apparatus for a power save mode through a TDLS direct link in a WLAN system.

In an aspect, a method for a power save mode in a wireless local area network is provided. The method includes establishing a Tunneled Direct link Setup (TDLS) direct link with a peer station, transmitting, to the peer station via an access point (AP) or via the TDLS direct link, a power save mode (PSM) request frame including a wakeup schedule for the PSM, the wakeup schedule including a wakeup window duration and a wakeup interval, the wakeup window duration indicating a duration of a wakeup window, the wakeup interval indicating a time interval between consecutive wakeup windows, and receiving, from the peer station via the TDLS direct link, a PSM response frame in response to to the PSM request frame.

The method may further include waking up to enter a wakeup state before transmitting the PSM request frame, wherein the wakeup state is maintained until the the PSM response frame is received.

Establishing the TDLS direct link may includes transmitting a TDLS setup request frame to the peer station via the AP, receiving a TDSL setup response frame in response to the TDLS setup request frame from the peer Station via the AP, and transmitting a TDSL setup confirm frame in response to the TDSL setup response frame to the peer Station via he AP.

The PSM Request Frame may be an encapsulated data frame.

The PSM response frame may include a status field indicating acceptance or rejection of the wakeup schedule.

If the status field indicates the rejection, the PSM response frame may include an alternative wakeup schedule.

The wakeup schedule further may include an idle count indicating the number of consecutive wakeup windows during no directed frame is received from the peer station before the peer station deletes the wakeup schedule.

In another aspect, a wireless apparatus for a power save mode in a wireless local area network is provided. The wireless apparatus include an interface unit, and a processor operatively couples with the interface unit and configured to establish a Tunneled Direct link Setup (TDLS) direct link with a peer station, transmit, to the peer station via an access point (AP) or via the TDLS direct link, a power save mode (PSM) request frame including a wakeup schedule for the PSM, the wakeup schedule including a wakeup window duration and a wakeup interval, the wakeup window duration indicating a duration of a wakeup window, the wakeup interval indicating a time interval between consecutive wakeup windows, and receive, from the peer station via the TDLS direct link, a PSM response frame in response to to the PSM request frame.

To enter a power save mode after establishing a TDLS direct link, a station can acknowledge the timing of the periodic wakeup schedule. Power consumption for setting up the power save mode may be reduced.

DESCRIPTION OF EXEMPLARY EMBODIMENTS

Figure 1:
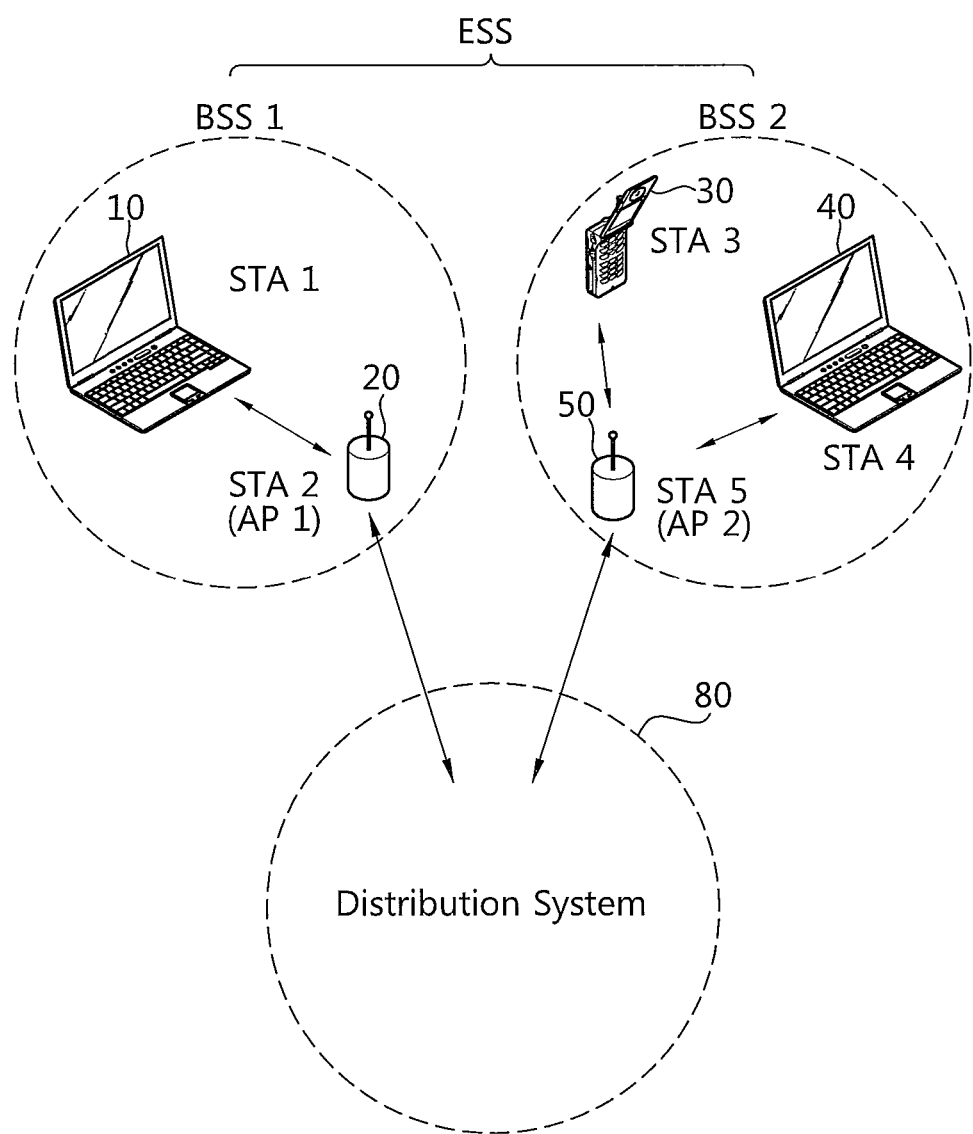
FIG. 1 illustrates a wireless local area network (WLAN) system to implement an embodiment of the present invention.

FIG. 1 illustrates a wireless local area network (WLAN) system to implement an embodiment of the present invention. The WLAN system includes at least one Basic Service Set (BSS). A BSS is a set of stations (STAs) that are successfully synchronized in order to communicate each other. The BSS may be classified into an independent BSS and an infrastructured BSS (IBSS).

The BSS1 and BSS2 in FIG. 1 are the IBSS including AP1 20 and AP2 50, respectively. The BSS1 includes STA1 10, STA2 20, and AP1 20. The BSS2 includes STA3 30, STA4 40 and AP2 50. An access point (AP) is a STA that provides a distribution service. The independent BSS is operated as an ad-hoc mode, and does not include any AP. A plurality of IBSSs are connected by means of a distribution system (DS) 80. An extended service set (ESS) is a plurality of BSSs connected through the DS 80. In the same ESS, a non-AP STA can be moved from a BSS to other BSS while performing a seamless communication.

A STA is any functional medium including a medium access control (MAC) layer and a physical (PHY) layer that are satisfied with the IEEE 802.11 standard. The STA may be an AP or a non-AP STA, but in the absence of any different indication hereinafter, a STA refers to a non-AP STA. The STA can be called any other name, such as a user equipment (UE), a mobile station (MS), a mobile terminal, a portable device, an interface card, and the like. An AP is a functional medium that provides the connection through a wireless medium. The AP can be called any other name, such as a centralized controller, a base station (BS), a scheduler, and the like.

A tunneled direct link setup (TDLS) is a protocol that uses encapsulated frames via an AP in order to setup a direct link. An encapsulation frame is transferred as a data frame in view of the AP but is processed as a management frame between non-AP STAs. A sender sends the encapsulation frame to a recipient via the AP transparently. Hereinafter, a direct link or a TDLS direct link refers to a direct link that is set up through TDLS.

Figure 2:
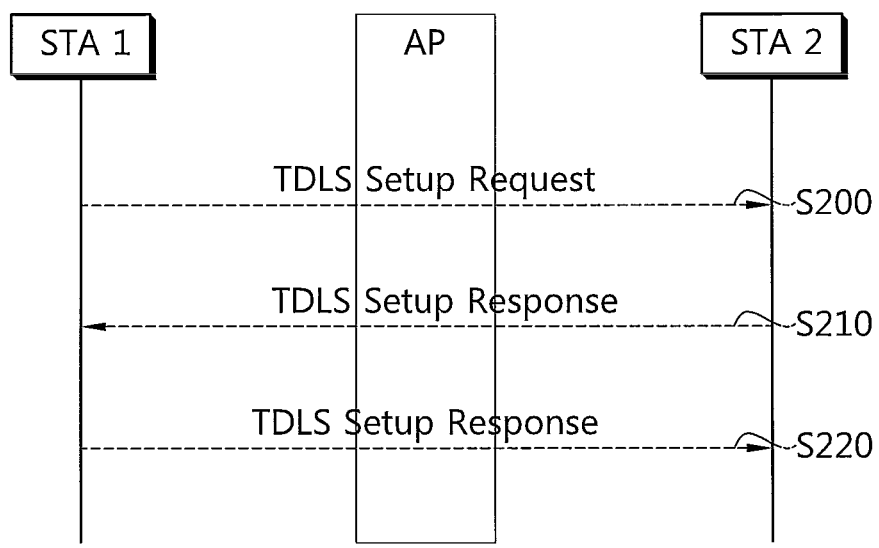
FIG. 2 illustrates a conventional procedure to setup a TDLS direct link.

FIG. 2 illustrates a conventional procedure to setup a TDLS direct link. This can refer the section 11.20 of IEEE 802.11z/D3.0 "Draft Amendment for Direct link Setup" published at November 2008. The IEEE 802.11z standard supports the TDLS direct link between non-AP STAs supporting IEEE 802.11e via a AP supporting IEEE 802.11a/b/g. Dotted lines in FIG. 2 illustrate transmissions of encapsulated DATA frames.

Referring to FIG. 2, in step S200, A STA1 transmits a TDLS setup request frame to a STA2 via an AP. The TDLS Setup Request Frame is a TDLS action frame for requesting the setup of the direct link.

In step S210, the STA2 transmits a TDLS setup response frame to the STA1 via the AP in response to the TDLS setup request frame.

In step S220, the STA1 transmits a TDSL setup confirm frame to the STA2 via the AP in order to confirm that the TDSL setup response Frame is received.

In the TDLS setup process, there is high possibility to miss some TDLS action frame because the TDLS action frame is encapsulated and transmitted as a data frame via the AP. Therefore, an initiating STA (i.e., STA1) transmits the TDLS setup confirm frame in response to the TDLS setup response frame from a peer STA (i.e., STA2).

The initiating STA (i.e., STA2) may be called a TDLS initiator and is a STA that transmits a TDLS setup request frame. The Peer STA may be called a TDLS responder and is a STA that receives the TDLS setup request frame. In FIG. 2, the initiating STA is the STA1 and the peer STA is the STA2.

A TDLS action frame is a frame associated with configuration of TDLS and release of TDLS, and is encapsulated as a data frame. The AP regards the TDLS action frame as the data frame. Therefore, although the AP does not support IEEE 802.11e, the TDLS action frame may be transmitted to the peer STA via the AP.

Figure 3:
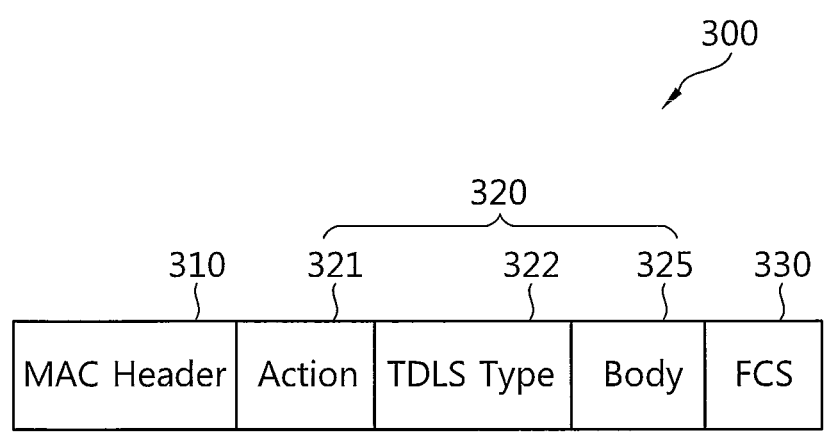
FIG. 3 illustrates the format of a TDLS action frame.

FIG. 3 illustrates the format of a TDLS action frame. The format of the TDLS action frame is just an example, so that additional field may be added or some field can be omitted.

A TDLS action frame 300 includes a MAC header 310, a frame body 320, and a frame check sequence (FCS) 330. The MAC header 310 may include a frame control field, a Duration/ID field, a plurality of Addresses, such as Address 1, Address 2, Address 3, and Address 4, a sequence control field, a Quality of Service (QoS) control field, and the like. The FCS 330 includes a cyclic redundancy check (CRC) for the MAC header 310 and the frame body 320.

The frame body 320 includes an action field 321, a TDLS type field 322, and a body Field 325. The action field 321 indicates that the encapsulated data frame is the TDLS action frame. The TDLS type field 322 indicates a type of the TDLS action frame 300. The body field 325 includes information according to the type of the TDLS action frame 300.

According to the section 7.4 of IEEE 802.11z/D3.0, the types of TDLS Action Frames are defined as following:

TABLE 1

| Field Value | Type |
| --- | --- |
| 0 | TDLS Setup Request |
| 1 | TDLS Setup Response |
| 2 | TDLS Setup Confirm |
| 3 | TDLS Teardown |
| 4 | TDLS Peer Traffic Indication |

TABLE 1-continued

| Field Value | Type |
| --- | --- |
| 5 | TDLS Channel Switch Request |
| 6 | TDLS Channel Switch Response |
| 7 | TDLS Peer PSM Request |
| 8 | TDLS Peer PSM Response |
| 9 | TDLS AP PHY Rate Request |
| 10 | TDLS AP PHY Rate Response |
| 11~255 | Reserved |

The TDLS setup request frame, the TDLS setup response frame and the setup confirm frame are used to set up the direct link as described above.

The TDLS peer PSM request frame and the TDLS peer PSM response frame are used to set up a power save mode (PSM).

In section 11 of the IEEE 802.11z/D3.0, there are two types of PSM. One is a peer PSM, and another is a peer unscheduled-automatic power save delivery (U-APSD). The peer PSM is a power management mechanism on the basis of a periodic wakeup schedule. The peer U-APSD is a non-scheduled power management mode.

In the peer U-APSD, two STAs are in a doze state after the direct link is established. A STA (called a buffer STA) transmits a TDLS peer traffic indication frame to a peer STA (called a sleep STA) in the doze state via an AP. The TDLS peer traffic indication frame is an encapsulated data frame. The sleep STA received the TDLS peer traffic indication frame enters into a wakeup state, and receives data frames via the direct link. According to the peer U-APSD, the buffer STA does not know when the sleep STA triggers a service period. Therefore, the buffer STA needs to remain in the wakeup state after transmitting the TDLS peer traffic indication frame.

Figure 4:
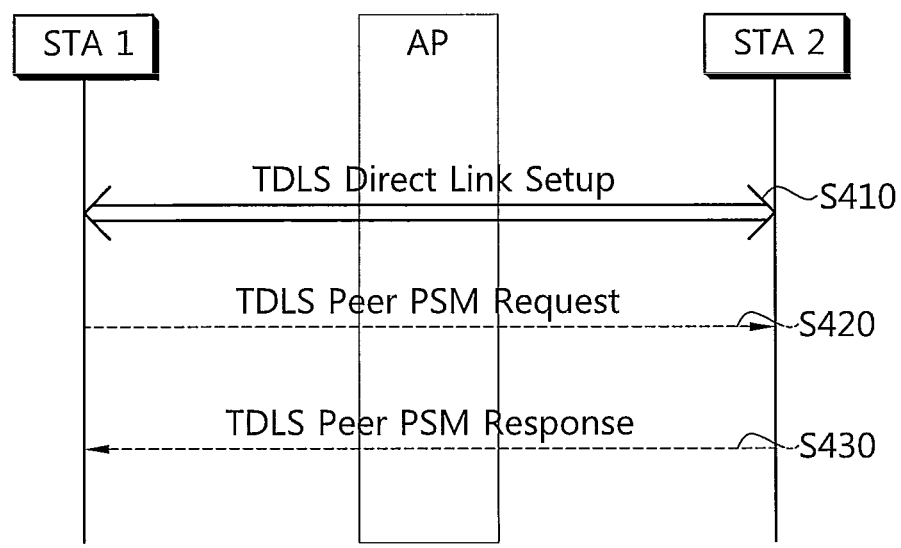
FIG. 4 illustrates a procedure to setup a peer PSM.

FIG. 4 illustrates a procedure to setup a peer PSM.

In step S410, a TDLS direct link is established between a STA1 and a STA2. In step S420, the STA1 transmits a TDLS peer PSM request frame to the STA2 via an AP. In step S430, the STA2 transmits a TDLS peer PSM response frame to the STA1 via the AP.

The TDLS peer PSM request frame (shortly, a PSM request frame) and the TDLS peer PSM response frame (shortly, a PSM response frame) are transmitted as encapsulated data frames via the AP. Since the AP can arbitrarily forwards the data frames to the peer STA, a STA which transmits a frame does not know when the AP forwards he frame to the peer STA. For example, if the peer STA is in the doze state, the AP does not forward the frame to the peer STA before the peer ST enters the wakeup state.

Synchronization is one of key issues to perform a scheduled power management efficiently. Synchronization means that a wakeup schedule of a STA matched with a wakeup schedule of a peer STA. But it is not easy to acquire the synchronization of the two STAs if the encapsulated data frames are used.

Therefore, the proposed method facilitates the synchronization in the scheduled power management.

Figure 5:
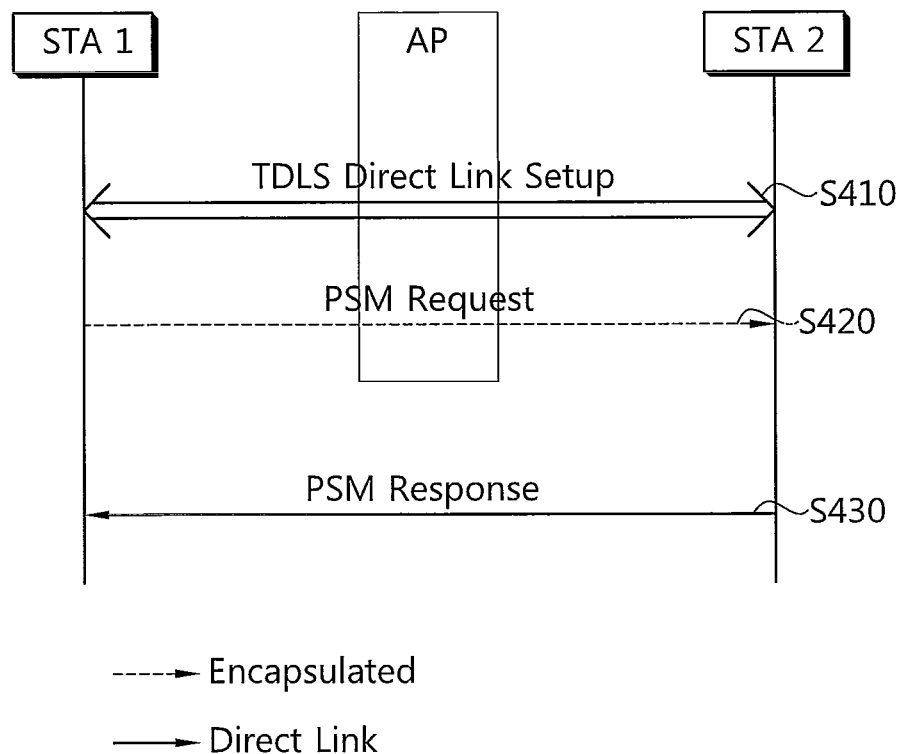
FIG. 5 illustrates a method of PSM according to an embodiment of the invention.

FIG. 5 illustrates a method of PSM according to an embodiment of the invention.

In step S510, a TDLS direct link is established between a STA1 and a STA2. The TDLS direct link can be established according to a procedure shown in FIG. 2.

In step S520, a STA1 transmits a PSM request frame to the STA2 via an AP or via the TDDLS direct link. The PSM request frame is transmitted as an encapsulated data frame via the AP.

The PSM request frame includes a wakeup schedule. The wakeup schedule includes a wakeup window duration, a wakeup interval and/or an idle count.

The wakeup window duration indicates a duration in which a STA remains in the wakeup state (or in the doze state). The wakeup window duration may indicate a duration of a wakeup window. The STA stays awake for the duration of the wakeup window.

The wakeup interval indicates a time interval between two consecutive wakeup windows.

The idle count indicates the number of consecutive wakeup windows during no directed frame is received from a peer STA before the peer STA deletes the wakeup schedule. If a service period is not started for wakeup windows indicated by the idle count, the peer STA can delete the wakeup schedule for this link. This means that related periodic wakeup no longer occurs. When traffics arrive at the peer STA in PSM for the link with no existing wakeup schedule, the STA may send a TDLS peer PSM request frame via a AP to activate a new wakeup schedule. The service period is a contiguous period of time during one or more unicast frames are transmitted between two peer STAs when at least one STA employs the peer PSM. The service period may be initiated during the wakeup window.

In step S430, STA2 transmits a PSM response frame as a response to the PSM request frame to the STA1 via the TDLS direct link.

Figure 6:
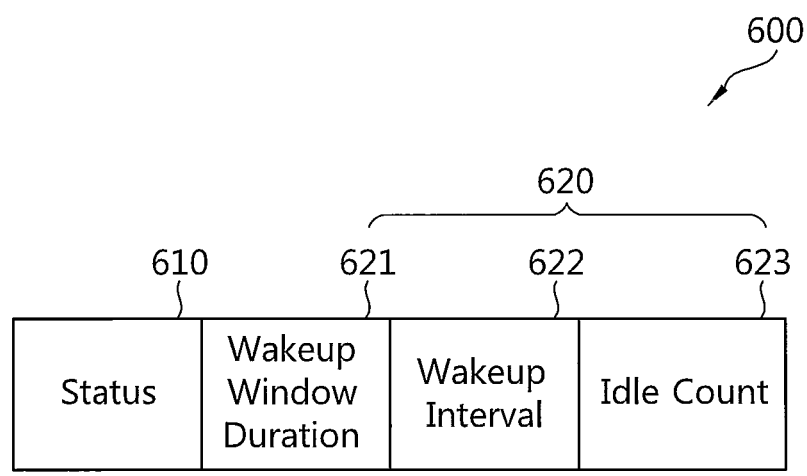
FIG. 6 illustrates a format of a PSM response frame.

FIG. 6 illustrates a format of a PSM response frame. This is exemplary purpose only, and the order of each of the information element (IE) may be changed. Other IF may be added or some IE may be omitted.

The PSM response frame includes a status field 610 and an alternative wakeup schedule 620. The status field 610 indicates acceptance or rejection of the wakeup schedule included in the PSM request frame. When the status field 610 indicates the rejection, the alternative wakeup schedule 620 includes a proposed wakeup schedule to the peer STA. The wakeup window duration 621, the wakeup interval 622 and/or the idle count 623 included in the alternative wakeup schedule 620 have the same meaning as in the PSM request frame.

After sending the PSM request frame, the STA1 may remain in the wakeup state to monitor the arrival of the PSM response frame via the TDLS direct link. The STA1 may remain in the wakeup state until the PSM response frame is received.

The PSM response frame is transmitted via the TDLS direct link. This is for the synchronization of the wakeup schedule between the two STAs and for reducing power consumption for monitoring the PSM response frame.

It is assumed that the PSM response frame which indicates the acceptance of the wakeup schedule is transmitted as an encapsulated data frame via the AP. The PSM response frame can be dropped by the AP. The STA2 operates in the PSM but STA1 still keeps monitoring of the PSM response frame. In addition, it is not easy that the STA1 and STA2 determine when the wakeup schedule is initiated since the STA1 and the STA2 cannot know when the PSM response frame is transmitted via the AP.

Accordingly, the STA2 transmits the PSM response frame to the STA1 via the TDLS direct link.

The wakeup schedule may be started from a time point that the PSM response frame is received. The STA1 can directly receive the PSM response frame since the STA1 remains in the wakeup state after sending the PSM request frame. A start point of the first wakeup window can be set to a certain offset or Target Beacon Transmission Time (TBTT) after a time point that the PSM response frame is received. The wakeup schedule between the two STAs may be synchronized on the basis of a fixed time point or a transmitted frame (i.e., beacon frame) after receiving the PSM response frame.

Figure 7:
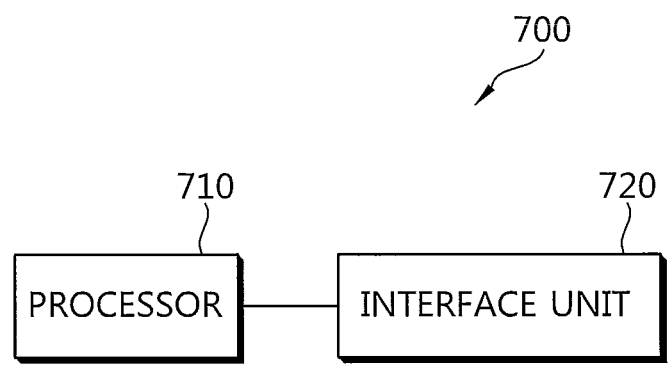
FIG. 7 illustrates a wireless apparatus to implement an embodiment of the present invention.

FIG. 7 illustrates a wireless apparatus to implement an embodiment of the present invention.

A wireless apparatus 700 includes a processor 710 and an interface unit 720. The interface unit 720 provides the processor 710 with an interface for other devices. The processor 710 implements a physical layer and a MAC layer. The embodiment of FIG. 5 may be implemented by the processor 720. The processor 720 may setup a connection with other stations (i.e., AP or a peer station), and transmits and/or receives frames.

The processor 710 may include an application-specific integrated circuit (ASIC), other chip sets, logic circuits and/or data processing devices. When the embodiments are implemented in software, the techniques described herein can be implemented with modules (e.g., procedures, functions, and so on) that perform the functions described herein.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for a power save mode (PSM) in a wireless local area network, the method comprising:
    establishing, by a station, a Tunneled Direct link Setup (TDLS) direct link with a peer station via an access point (AP);
    entering, by the station, the power save mode (PSM);
    transmitting, by the station after waking up to enter a wakeup state, a PSM request frame to the peer station, the PSM request frame including a wakeup schedule for the PSM, the wakeup schedule including a wakeup window duration and a wakeup interval, the wakeup window duration indicating a duration of a wakeup window, the wakeup interval indicating a time interval between consecutive wakeup windows; and
    receiving, by the station, a PSM response frame from the peer station through the TDLS direct link directly in response to the PSM request frame,
    wherein the wakeup state is maintained until the PSM response frame is received, and
    wherein the PSM request frame is not directly transmitted to the peer station, but the PSM request frame is transmitted to the peer station though the AP.

2. The method of claim 1, wherein establishing the TDLS direct link includes:
    transmitting a TDLS setup request frame to the peer station via the AP;
    receiving a TDSL setup response frame in response to the TDLS setup request frame from the peer Station via the AP; and
    transmitting a TDSL setup confirm frame in response to the TDSL setup response frame to the peer Station via the AP.

3. The method of claim 1, wherein the PSM request frame is an encapsulated data frame.

4. The method of claim 1, wherein the PSM response frame includes a status field indicating acceptance or rejection of the wakeup schedule.

5. The method of claim 4, wherein if the status field indicates the rejection, the PSM response frame includes an alternative wakeup schedule.

6. The method of claim 1, wherein the wakeup schedule further includes an idle count indicating the number of consecutive wakeup windows during which no directed frame is received from the peer station before the peer station deletes the wakeup schedule.

7. The method of claim 1, wherein the wakeup schedule is initiated when the PSM response frame is received.

8. A wireless apparatus for a power save mode (PSM) in a wireless local area network, the wireless apparatus comprising:
    an interface unit; and
    a processor operatively couples with the interface unit and configured to:
        establish a Tunneled Direct link Setup (TDLS) direct link with a peer station via an access point (AP);
        enter the power save mode (PSM);
        after waking up to enter a wakeup state, transmit a PSM request frame to the peer station, the PSM request frame including a wakeup schedule for the PSM, the wakeup schedule including a wakeup window duration and a wakeup interval, the wakeup window duration indicating a duration of a wakeup window, the wakeup interval indicating a time interval between consecutive wakeup windows; and
        receive a PSM response frame from the peer station through the TDLS direct link directly in response to the PSM request frame,
    wherein the wakeup state is maintained until the PSM response frame is received, and
    wherein the PSM request frame is not directly transmitted to the peer station but the PSM request frame is transmitted to the peer station though the AP.

9. The wireless apparatus of claim 8, wherein the processor is configured to establish the TDLS direct link by:
    transmitting a TDLS setup request frame to the peer station via the AP;
    receiving a TDSL setup response frame in response to the TDLS setup request frame from the peer station via the AP; and
    transmitting a TDSL setup confirm frame in response to the TDSL setup response frame to the peer Station via the AP.

10. The wireless apparatus of claim 8, wherein the PSM request frame is an encapsulated data frame.

11. The wireless apparatus of claim 8, wherein the PSM response frame includes a status field indicating acceptance or rejection of the wakeup schedule.

12. The wireless apparatus of claim 11, wherein if the status field indicates the rejection, the PSM response frame includes an alternative wakeup schedule.

13. The wireless apparatus of claim 8, wherein the wakeup schedule further includes an idle count indicating the number of consecutive wakeup windows during which no directed frame is received from the peer station before the peer station deletes the wakeup schedule.

14. The wireless apparatus of claim 8, wherein the wakeup schedule is initiated when the PSM response frame is received.

\* \* \* \* \*